G. A. DEARDORFF.
ROUTE INDICATOR.
APPLICATION FILED APR. 9, 1912.
1,050,434.
Patented Jan. 14, 1913.
2 SHEETS—SHEET 1.
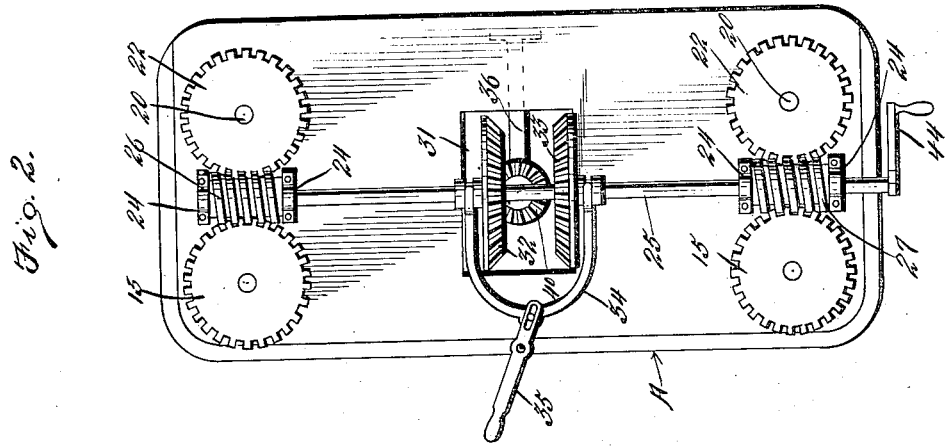
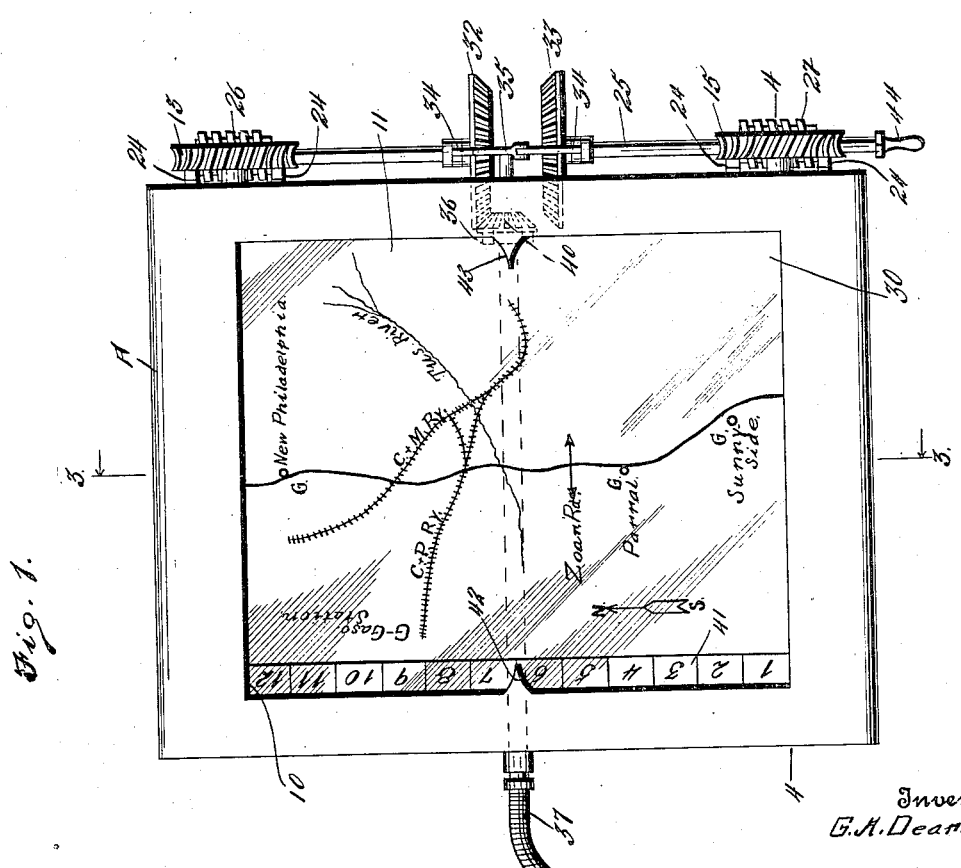
Witnesses
Inventor
G. A. Deardorff.
By
Attorney G. A. DEARDORFF.
ROUTE INDICATOR.
APPLICATION FILED APR. 9, 1912.
1,050,434.
Patented Jan. 14, 1913.
2 SHEETS—SHEET 2.
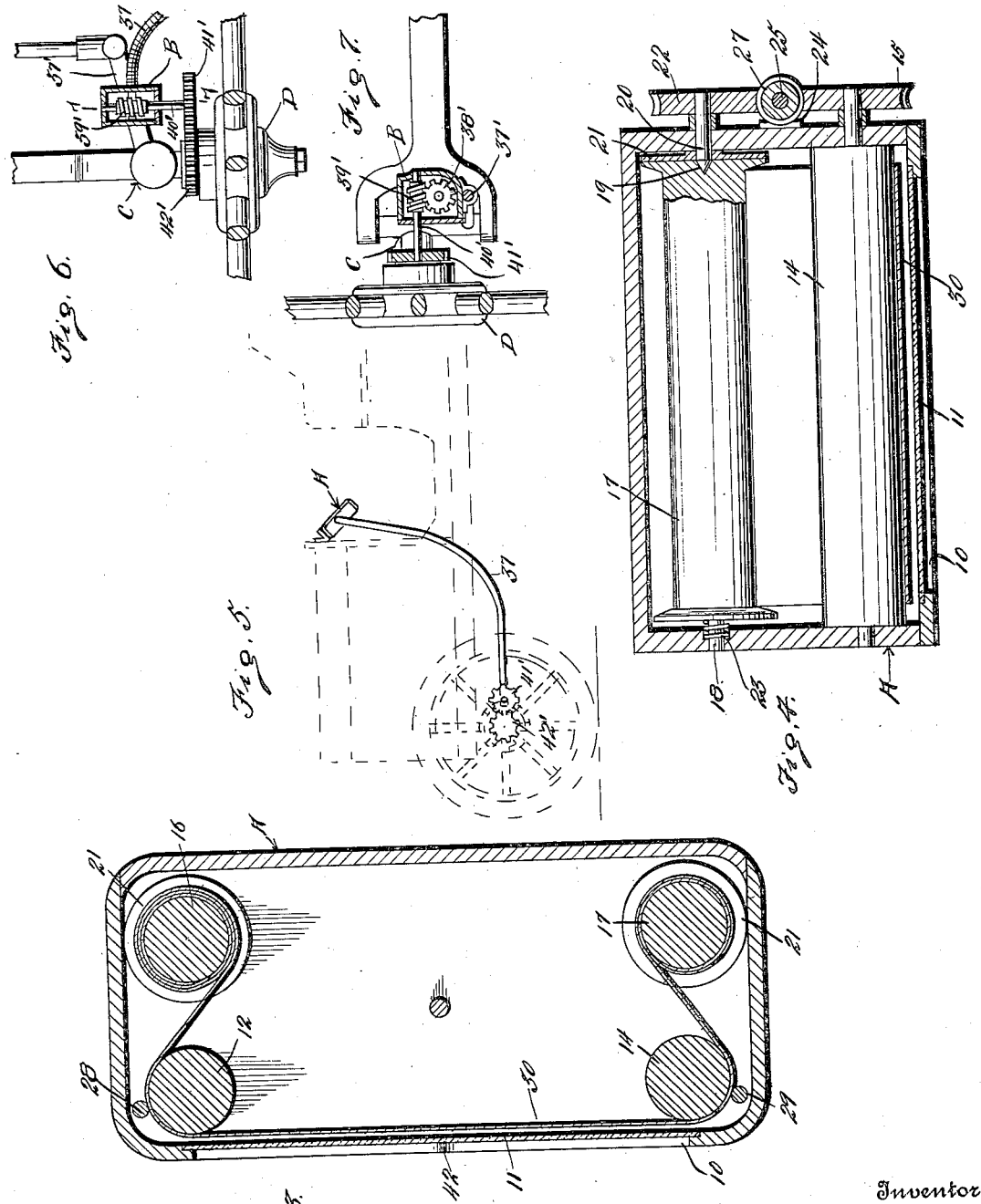

UNITED STATES PATENT OFFICE.

GEORGE A. DEARDORFF, OF OCCOQUAN, VIRGINIA.

ROUTE-INDICATOR.

1,050,434. Specification of Letters Patent. Patented Jan. 14, 1913.

Application filed April 9, 1912. Serial No. 689,497.

*To all whom it may concern:*

Be it known that I, GEORGE A. DEARDORFF, a citizen of the United States, residing at Occoquan, in the county of Prince William, State of Virginia, have invented certain new and useful Improvements in Route-Indicators; and I do hereby declare the following to be a full, clear, and exact description of the invention, such as will enable others skilled in the art to which it appertains to make and use the same.

This invention relates to route indicators.

The object of the invention resides in the provision of a route indicator particularly adapted for association with an automobile and through the instrumentality of which the automobile driver may ascertain at a glance his exact position on the route over which he is traveling.

A further object of the invention resides in the provision of a route indicator of the character referred to which is adapted to be operatively connected to such movable part of the automobile that when same has traversed a given distance the indicator shall have been operated to designate the distance traveled and the exact position the automobile has reached on the route as the result of such travel.

With the above and other objects in view, the invention consists in the details of construction and in the arrangement and combination of parts to be hereinafter more fully described and particularly pointed out in the appended claims.

In describing the invention in detail, reference will be had to the accompanying drawings wherein like characters of reference denote corresponding parts in the several views, and in which—

Figure 1 is a front elevation of a route indicator constructed in accordance with the invention, Fig. 2, an elevation looking at the right hand side of Fig. 1, Fig. 3, a section on the line 3—3 of Fig. 1, Fig. 4, a section on the line 4—4 of Fig. 2, Fig. 5, a side elevation of an automobile showing the invention associated therewith, the automobile being shown in dotted lines and the indicator and the parts thereof connecting same to the hub of one of the front wheels of the automobile, Fig. 6, a fragmental plan view partly in section of one of the front wheels of the automobile showing the connections between the indicator and said wheel, and Fig. 7, a section on the line 7—7 of Fig. 6.

Referring to the drawings the invention is shown as comprising a suitable casing A having its front side provided with an opening 10 across which is disposed a glass plate 11 whereby the indicator may be at all times observed. Journaled between the side members of the casing A near the forward limitation of said side members and at the upper end of the glass plate 11 is a web driving roller 12 one trunnion of which is extended through a side member of the casing and has fixed thereon a worm wheel 13. Journaled between the side members of the casing A in vertical alinement with the web driving roller 12 and at the bottom of the glass plate 11 is another web driving roller 14 which also has one trunnion thereof extended through a side member of the casing in a manner similar to the corresponding trunnion of the web driving roller 12 and fixed on the extended trunnion of the web driving roller 14 is a worm wheel 15 corresponding to the worm wheel 13. Journaled between the side members of the casing A in horizontal alinement with and at the rear of the web driving roller 12 is a web reel 16, while a corresponding web reel 17 is journaled between the side members of the casing A in vertical alinement with the web reel 16. Each of the web reels 16 and 17 is provided with only one trunnion 18 which is journaled in the side of the casing A remote from the worm wheels 13 and 15. The opposite end of each of the web reels is provided with an axial recess 19 which receives therein the inner end of a stub shaft 20 journaled in the side of the casing A adjacent the worm wheels 13 and 15. Each of the stub shafts 20 has fixed on its inner end a friction disk 21 adapted to frictionally engage the end of the adjacent web reel for a purpose that will presently appear. Fixed on the outer end of each of the stub shafts 20 is a worm wheel 22. Surrounding the trunnion of each web reel 16 and 17 is a coil spring 23 one end of which bears against the adjacent side of the casing A while the other end thereof bears against the end of the adjacent web reel. These springs constantly tend to force the web reels 16 and 17 into frictional engagement with the adjacent friction disks 21.

Mounted on the outer face of the side member of the casing A which is adjacent the friction disks 21 are vertically alined journal brackets 24 in which is rotatably mounted a shaft 25. The position of this shaft is such that it is disposed between and equidistant from the worm wheel 13 and the adjacent worm wheel 22 and also between and equidistant from the worm wheel 15 and the adjacent worm wheel 22. Fixed on the upper end of the shaft 25 and operatively engaging the worm wheel 13 and the adjacent worm wheel 22 is a worm 26, while another worm 27 is fixed on the lower end of the shaft 25 and operatively engages the worm wheel 15 and the adjacent worm wheel 22. Journaled between the side members of the casing A above the web driving roller 12 is a friction roller 28 while another friction roller 29 is journaled between the side members of the casing A beneath the web driving roller 14. Passing over the web driving rollers 28 and 29 is a web 30 the terminals of which are adapted to be alternately wound upon the web reels 16 and 17 according to the direction of movement of the parts of the indicator which movement is adapted to be imparted to the various parts of the indicator by the rotation of the shaft 25 as will be apparent. The side member of the casing A adjacent the shaft 25 is provided with a central opening 31 and splined upon this shaft 25 and disposed in the opening 31 are opposed beveled gears 32 and 33. The hubs of these gears 32 and 33 are engaged respectively by the arms of a yoke 34 which is adapted to be operated longitudinally of the shaft 25 by means of a lever 35 pivoted on the casing A.

Mounted in the casing A is a bracket 36 which rotatably supports one end of a flexible shaft 37, said shaft extending through the casing and having fixed on the end thereof disposed within the casing A a beveled gear 40 adapted to be operatively engaged by one or the other of the gears 32 and 33 as said last named gears are moved longitudinally of the shaft 25. The end of the flexible shaft 37 disposed without the casing A is journaled in the wall of and extends into a casing B suitably mounted upon the arm 37' of the steering knuckle C. The end of the shaft 37 disposed within the casing B has fixed thereon a worm wheel 38' which meshes with a worm 39' fixed on a shaft 40' journaled in the walls of the casing B and having one end disposed exteriorly of the casing adjacent the hub D of the forward wheel of the automobile. This shaft 40' has fixed on the end thereof disposed exteriorly of the casing B a gear 41' which meshes with a gear 42' mounted upon the hub D whereby the rotation of said hub will through the medium of the various connections just referred to actuate the indicator.

The web 30 is adapted to have imprinted thereon a suitable route map and arranged along one side of this map is a mile scale 41. The reading line of the map and mile scale is indicated by inwardly directed pointers 42 and 43 formed respectively at corresponding points on opposite sides of the opening 10. It will be noted that the gears 32 and 33 are a sufficient distance apart to allow for both gears to be disposed out of engagement with the gear 40 during the movement of the gears 32 and 33 longitudinally of the shaft 25 so that said shaft 25 may be operated by hand through the medium of a crank 44 fixed on the lower end thereof. Such rotation of the shaft 25 permitting the web 30 to be set so as to bring the map and mile scale imprinted thereon into proper relation with the pointers 42 and 43. The disengagement of the gears 32 and 33 is also useful in cases where the automobile is required to deviate from its normal route. In such an instance the disengagement of the gears 32 and 33 from the gear 40 renders the entire route indicator inactive so that when the automobile returns to the point where it left the normal route it will only be necessary to bring the desired gears 32 and 33 into engagement with the gear 40 without indulging in any resetting of the map with respect to the pointers 42 and 43.

In operation the point on the map imprinted upon the web 30 at which the automobile starts is first brought in line with the pointers 42 and 43 by the manual operation of the shaft 25. After the map has been thus set and the gear 32 brought into engagement with the gear 40 the automobile is started. The rotation of the front axle of the automobile will in turn rotate the flexible shaft 37 and this rotation of said shaft 37 will be transmitted to the shaft 25 through the medium of the gears 40 and 32. As will be apparent the rotation of the shaft 25 through the medium of the gears 40 and 32 will simultaneously rotate the worm wheels 13, 15 and 22 in the direction indicated by the arrows in Fig. 2. This rotation of the worm wheels 13, 15 and 22 will in turn effect the simultaneous rotation of the rollers 12, and 14 and the web reels 16 and 17 so that the web 30 will be unwound from the web reel 17 and wound upon the web reel 16.

It will be noted that the web 30 is frictionally engaged between the web driving rollers 12 and 14 and the friction rollers 28 and 29 respectively and the driving of the web is positively accomplished by the frictional engagement of the web with the rollers 12 and 14 and respective rollers 28 and 29. It will be further noted that the diameters of the rollers 12 and 14 and the web reels 16 and 17 is the same and that as they are all rotated at the same speed some compensation must be provided for the increasing peripheral speed of the web reels 16 and 17 as the web is wound thereon. This compensation is effected by the frictional engagement between the web reels 16 and 17 and respective friction plates 21. The friction between these web reels and respective plates 21 is less than the friction between the web and the rollers 12 and 14 and respective rollers 28 and 29. Thus, as the web is wound upon the reel 16 and the peripheral speed of the latter is increased by the lapping of the web thereon, the portion of the web between the reel 16 and the roller 12 will be tensioned but as the frictional engagement between the reel 16 and the plate 21 is less than the frictional engagement between the web and the rollers 12 and 28 the friction plate 21 will move ahead relatively to the reel 16 until the tension of the web just referred to is sufficiently reduced and thus compensated for the increased peripheral speed of said reel. The same compensation for the increased peripheral speed of the reel 17 is provided when the movement of the web 30 is reversed by shifting the gear 33 into engagement with the gear 40. The movements of the parts of the indicator are properly proportioned with respect to the rotation of the front axle of the automobile so that when said automobile has traversed a given distance of the route such movement shall have been imparted to the web 30 that the reading on the line of the pointers 42 and 43 will indicate the exact position of the automobile on the map imprinted on the web, and also the exact number of miles the automobile has traversed. On the return journey of the automobile over the same route it is only necessary to reverse the direction of the movement of the various parts of the indicator by reversing the rotation of the shaft 25 in a manner heretofore referred to.

What is claimed is:

1. In an indicator the combination of a casing having an observation opening, a pair of web reels rotatably mounted in said casing, each of said web reels having a trunnion journaled in one side of the casing and an axial recess formed in the other end thereof, a stub shaft journaled in the side of the casing remote from the trunnion of the reel and disposed in axial alinement with said trunnion, the inner end of said stub shaft being received by the axial recess in the reel, a friction plate fixed on the inner end of said stub shaft adapted to be engaged by the adjacent end of the reel, spring means constantly tending to force the reel into frictional engagement with said plate, a worm wheel fixed on the outer end of each stub shaft, a web having its terminals secured to respective web reels and adapted to be wound upon and unwound from the latter, web driving rollers journaled in the side members of said casing in horizontal alinement with respective web reels, said web driving rollers frictionally engaging the web and adapted during their rotation to move the web across the observation opening, each of said driving rollers having their trunnions adjacent the stub shafts extended through the casing, a worm wheel fixed on the outer ends of the extended trunnions of respective web driving rollers, a shaft journaled on the outer face of the side of the casing between the worm wheels fixed on said stub shaft and on the trunnion of the adjacent web driving roller, worms fixed on said shaft operatively engaging respectively adjacent worm wheels whereby the rotation of said shaft will simultaneously rotate all of said worm wheels to effect the movement of the web across the observation opening in a given direction, a flexible shaft journaled in the casing adapted for operative connection at one end to a rotatable member, and a reverse gear connection between the flexible shaft and the first named shaft.

2. In an indicator the combination of a casing having an observation opening, a pair of web reels rotatably mounted in said casing, each of said web reels having a trunnion journaled in one side of the casing and an axial recess formed in the other end thereof, a stub shaft journaled in the side of the casing remote from the trunnion of the reel and disposed in axial alinement with said trunnion, the inner end of said stub shaft being received by the axial recess in the reel, a friction plate fixed on the inner end of said stub shaft, adapted to be engaged by the adjacent end of the reel, spring means constantly tending to force the reel into frictional engagement with said plate, a web having its terminals secured to respective web reels and adapted to be wound upon and unwound from the latter, web driving rollers frictionally engaging said web and adapted during their rotation to move the web across the observation opening, and common means for simultaneously rotating said friction rollers and stub shafts to move the web in a given direction.

In testimony whereof, I affix my signature, in presence of two witnesses.

GEORGE A. DEARDORFF.

Witnesses:
J. E. SMITH,
W. L. JONES.